UNITED STATES PATENT OFFICE.

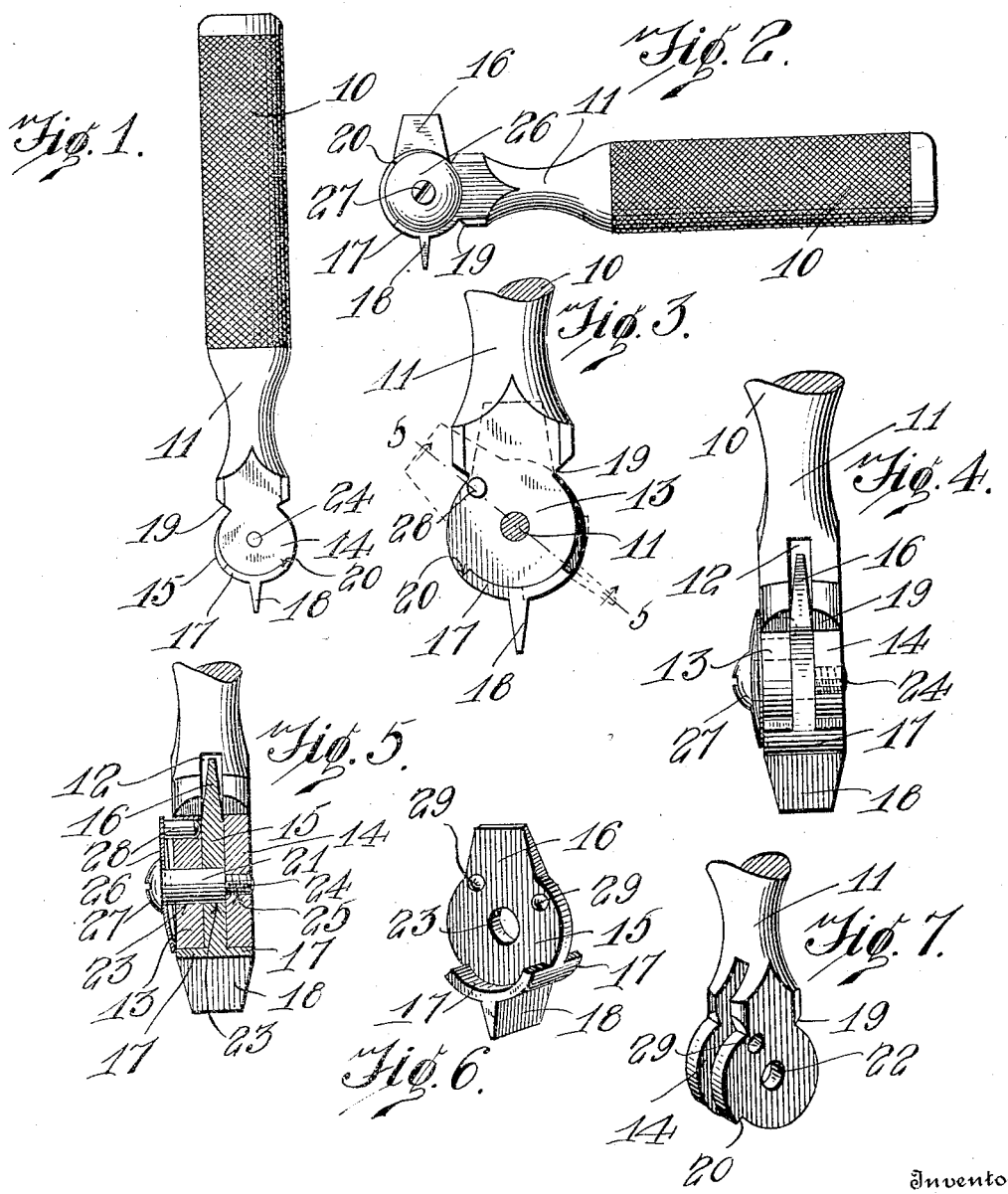

ADOLPH F. KEPPELER, OF BUTTE, MONTANA.

SCREW-DRIVER.

1,238,300. Specification of Letters Patent. Patented Aug. 28, 1917.

Application filed March 30, 1915, Serial No. 18,041. Renewed February 14, 1917. Serial No. 148,595.

*To all whom it may concern:*

Be it known that I, ADOLPH F. KEPPELER, a citizen of the United States, residing at Butte, in the county of Silverbow and State of Montana, have invented certain new and useful Improvements in Screw-Drivers, of which the following is a specification.

This invention relates to an improved screw driver and the principal object of the invention is to provide a screw driver of the type in which a disk carrying the screw engaging teeth is rotatably mounted between bearings carried by the handle with improved means for releasably holding the disk in an adjusted position.

Another object of the invention is to so construct this screw driver that the disk may be easily moved to an adjusted position but may be securely held in the adjusted position and thus prevented from slipping out of the desired position when in use.

Another object of the invention is to provide improved means for mounting the disk and spring holding the disk engaging pin in its normal position.

Another object of the invention is to provide a screw driver which is so constructed that the same will be very simple in construction and at the same time strong and durable and not liable to easily get out of order or need repair.

This invention is illustrated in the accompanying drawings, wherein:—

Figure 1 is a view showing the improved screw driver in side elevation with the disk in one position.

Fig. 2 is a view similar to Fig. 1 with the disk in an adjusted position.

Fig. 3 is an enlarged view of the outer end portion of the screw driver with the disk in the position shown in Fig. 1 and indicated in adjusted position by dotted lines.

Fig. 4 is a view similar to Fig. 3 but taken at right angles thereto.

Fig. 5 is a sectional view taken along the line 5—5 of Fig. 3.

Fig. 6 is a perspective view of the disk which is rotatably mounted between the bearings of the handle.

Fig. 7 is a perspective view of the outer end portion of the handle.

The handle 10 is provided with a neck 11 which terminates in a head having a slot 12 formed therein to provide the bearings 13 and 14.

The disk 15 is provided with a screw engaging bit 16 and is provided with abutment flanges 17 extending beyond the side faces of the disk and carrying a second screw engaging bit 18. When the disk is in position the abutment flanges 17 will engage the abutment shoulders 19 and 20 of the split head thus limiting the rotary movement of the disk and preventing it from moving beyond the desired amount.

This disk 15 is rotatably mounted between the bearings 13 and 14 upon the screw or pivot pin 21 which passes through the openings 22 and 23 formed in the bearing 13 and disk 15 and has its reduced threaded end portion 24 screwed into the threaded opening 25 formed in the bearing 14. By having the threaded end portion of the screw reduced an abutment shoulder is formed which engages the inner face of the bearing 14 and thus limits the extent to which the screw may pass through the bearing 14 thereby preventing the resilient disk 26 which forms a spring from being compressed beyond a desired amount. This disk 26 which is formed of resilient steel or other metal is engaged by the head 27 of the screw 21 and since it is normally bowed as shown clearly in Figs. 2, 4 and 5 it will apply pressure to the latch pin 28 slidably mounted in the opening 29 of the bearing 13. This latch pin 28 is provided with a rounded inner end portion as shown in Fig. 5 and therefore although the latch pin may be moved into the socket 29' of the disk 15 by the spring disk 26 to hold the disk in an adjusted position it may be forced out of the same to permit of adjustment of the disk by simply pressing upon the tooth 18 to rotate the disk.

When operating this screw driver the disk may be rotated to the position shown in Fig. 1 so that the screw driver may be used in the ordinary manner with the bit 18 engaging the screw. If it is desired to use the screw driver for removing screws or tightening them where the screw could not be conveniently reached if the disk were in the position shown in Fig. 1 the bit 18 will be pressed to rotate the disk and move the same to the position shown in Fig. 2. When in this position the eye of the screw can first be engaged by either the bit 16 or the bit 18 and the screw partially turned and the eye then engaged by the second bit thus permitting the screw to be turned a short distance with each operation of the screw driver. Therefore the screw can be readily inserted or removed with this screw driver when it could not be removed with a screw driver in which the bit remained in the relative position shown in Fig. 1. If desired the handle could be provided with a number of disks 15 each provided with bits of various sizes and thicknesses and the disks could be changed according to the size of the screws to be used.

What is claimed is:—

1. A screw driver comprising a handle provided at one end with bearings positioned in spaced relation, one of the bearings having an unthreaded opening and the second with a threaded opening, a disk positioned between said bearings and provided with a bit, a latch pin slidably carried by the bearing having the unthreaded opening for engaging the disk and releasably holding the same in an adjusted position, a concaved resilient disk engaging said latch pin, and a pivot pin passing through said resilient disk and through the unthreaded opening of said bearing and through said bit to rotatably mount the bit and having its end portions threaded and passing through the threaded opening of the second bearing whereby the tension of said resilient disk may be regulated by adjustment of said pivot pin.

2. A screw driver comprising a handle, bearings positioned at one end of said handle in spaced relation and cut away at one side to provide abutment shoulders at the junction of the handle and bearings and at a point about the circumference of the bearings, a disk rotatably mounted between said bearings and provided with side flanges extending to overhang the bearings to engage the abutment shoulders and limit the rotary movement of the disk, a bit extending across the outer faces of said flanges transversely of the disk, a bit extending from the opposite side portion of said disk at right angles to said first mentioned bit, and means for releasably holding said disk in an adjusted position.

In testimony whereof I affix my signature in presence of two witnesses.

ADOLPH F. KEPPELER.

Witnesses:
J. F. LINDLAND,
H. E. KNOX.

Copies of this patent may be obtained for five cents each, by addressing the "Commissioner of Patents, Washington, D. C."